(12) United States Patent
Nayar et al.

(10) Patent No.: US 7,621,037 B2
(45) Date of Patent: Nov. 24, 2009

(54) FIXTURING A HEAD SPINDLE ASSEMBLY WITH A RETRACTING COLLET

(75) Inventors: Sham Sunder Nayar, Savage, MN (US); John George Gerogeorge, Chanhassen, MN (US); Mark Curtis Fahrendorff, New Prague, MN (US); Ronald Jacob Smith, Belle Plaine, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 215 days.

(21) Appl. No.: 11/789,490

(22) Filed: Apr. 23, 2007

(65) Prior Publication Data

US 2008/0256787 A1 Oct. 23, 2008

(51) Int. Cl.
*G11B 5/127* (2006.01)
*H04R 31/00* (2006.01)

(52) U.S. Cl. ............. 29/603.03; 29/603.01; 29/603.04; 29/729; 360/240; 360/110

(58) Field of Classification Search ............. 29/603.01, 29/603.03, 603.04, 729, 737; 360/240, 110, 360/81, 900
See application file for complete search history.

(56) References Cited

U.S. PATENT DOCUMENTS

| | | | | |
|---|---|---|---|---|
| 3,023,279 | A | * | 2/1962 | Johnson et al. ............. 360/290 |
| 4,528,453 | A | | 7/1985 | Heller |
| 5,404,636 | A | * | 4/1995 | Stefansky et al. ........ 29/603.03 |
| 5,832,764 | A | | 11/1998 | Girard |
| 5,929,987 | A | | 7/1999 | Hayes |
| 5,959,450 | A | | 9/1999 | Moroe et al. |
| 5,987,735 | A | * | 11/1999 | Horning et al. ............... 29/737 |
| 6,389,684 | B1 | * | 5/2002 | Toensing et al. .............. 29/757 |
| 6,954,330 | B2 | * | 10/2005 | Yeom ...................... 360/99.12 |
| 7,021,097 | B1 | | 4/2006 | Ubl et al. |
| 7,027,141 | B2 | | 4/2006 | Girard et al. |
| 7,069,156 | B2 | | 6/2006 | Zeng |
| 7,082,670 | B2 | | 8/2006 | Boismier |
| 2002/0069510 | A1 | | 6/2002 | Girard et al. |
| 2002/0135926 | A1 | | 9/2002 | Girard et al. |
| 2004/0208440 | A1 | | 10/2004 | Tateiwa |
| 2004/0231139 | A1 | | 11/2004 | Jurgenson |
| 2006/0002028 | A1 | | 1/2006 | Nayar et al. |
| 2006/0072381 | A1 | | 4/2006 | Girard et al. |
| 2006/0109453 | A1 | | 5/2006 | Swift et al. |

OTHER PUBLICATIONS

Feb. 11, 2009 Oxford English Dictionary. http://dictionary.oed.com/cgi/entry/50000989?single=1&query_type=word&queryword=abutting&first=1&max_to_show=10.*

* cited by examiner

*Primary Examiner*—Derris H Banks
*Assistant Examiner*—Jeffrey Carley
(74) *Attorney, Agent, or Firm*—Fellers, Snider, et al.

(57) ABSTRACT

An apparatus and associated method is provided for precisely positioning a datum surface of a component. The apparatus has a housing defining a tooling datum surface. A collet is supported by the housing, and is thereby selectively operable between an expanded mode and a retracted mode. In the expanded mode, a clearing disengagement is defined with the component. In the retracted mode, a contacting engagement is defined with the component as well as a simultaneous longitudinal force that is transferred by the contacting engagement to the component capable of pressingly engaging the datum surfaces together. The apparatus further has a bias member urging the collet to the retracted mode.

3 Claims, 6 Drawing Sheets

FIXTURING A HEAD SPINDLE ASSEMBLY WITH A RETRACTING COLLET

BACKGROUND

Approaches used in performing precise operations on components and component assemblies have necessarily adapted to rapidly changing events affecting factory processes. For example, as miniaturization has proliferated in the electronics market the sheer size of the components and assemblies has rendered some past measurement approaches obsolete. Also, although electronics packages are continually shrinking, the converse is generally true for the feature sets being offered. That is, a predominant demand driving the electronics market now and for the foreseeable future is for more complex and capable devices in ever-smaller sizes.

To keep pace with this evolving market, manufacturers have replaced static measuring tools and fixtures with highly complex processor controlled measurement systems. Successful efforts have also been employed to reengineer the factory to build quality into the process rather than inspect quality into the product.

These and other recent improvements in the art have significantly improved not only the ability to perform precise measurements, but have also forged gains in the often competing goals of enhanced quality and faster throughput. It is to the furthering of those efforts that the embodiments of the present invention are directed.

SUMMARY

Embodiments of the present invention are generally directed to instrumentation devices used in a manufacturing process.

In some embodiments an apparatus and associated method are provided for precisely positioning a datum surface of a component. The apparatus has a housing defining a tooling datum surface. A collet is supported by the housing, and is thereby selectively operable between an expanded mode and a retracted mode. In the expanded mode, a clearing disengagement is defined with the component. In the retracted mode, a contacting engagement is defined with the component as well as a longitudinal force that is transferred by the contacting engagement to the component capable of pressingly engaging the datum surfaces together. The apparatus further has a bias member urging the collet to the retracted mode.

These and various other features and advantages which characterize the claimed embodiments will become apparent upon reading the following detailed description and upon reviewing the associated drawings.

DETAILED DESCRIPTION

Figure 1:
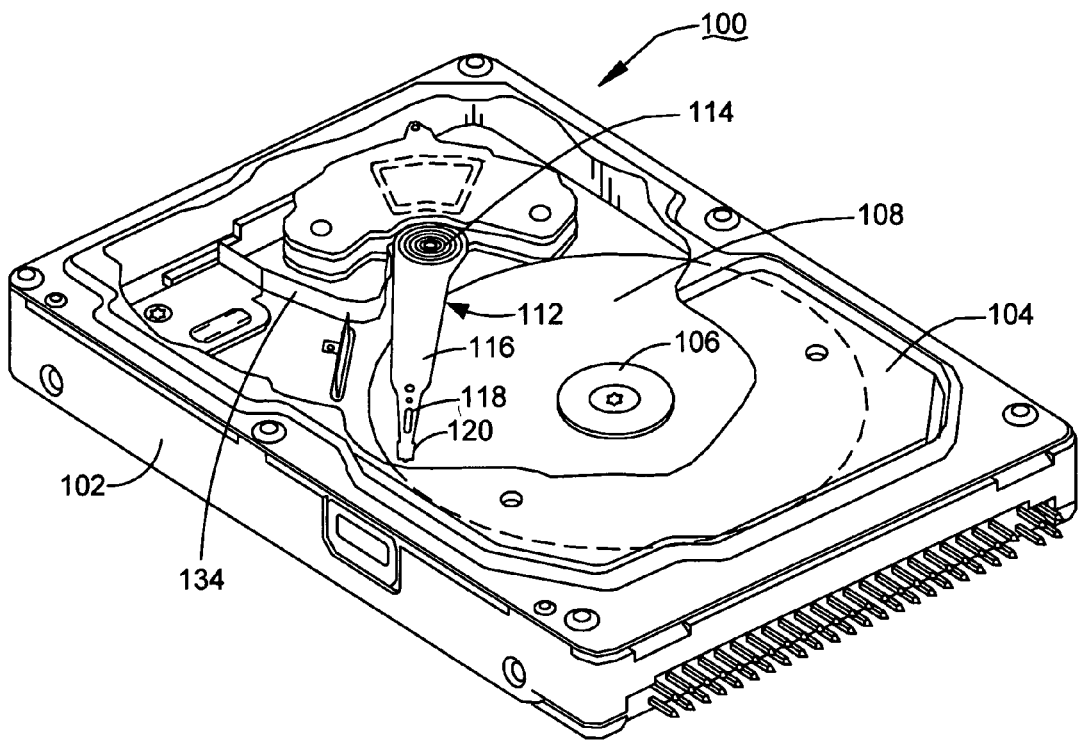
FIG. 1 is an isometric view of a data storage device suited for using embodiments of the present invention.

Referring to the drawings in general, and more particularly to FIG. 1 that shows an isometric view of a data storage device 100 (or "drive") suited for using embodiments of the present invention. Although the illustrative embodiments describe fixturing of components in the data storage device 100, the claims are not so limited. The claimed subject matter can be practiced on other types of components where precise measurements and/or positioning is needed in alternative equivalent embodiments.

The drive 100 preferably includes a base 102 and a cover 104 (partially cutaway), which together provide a housing for a number of components. The components include a motor to which a clamp 106 is attached for fixing one or more storage mediums 108 (or "discs") in rotation therewith. Adjacent the disc 108 is an actuator 112 that is pivotable around a spindle bearing 114 by selectively energizing a voice coil motor ("VCM") 115.

The actuator 112 includes an arm 116 supporting a suspension 118 that, in turn, supports a head 120 (or "transducer") at a distal end thereof in a data transfer relationship with the disc 108. The actuator 112, bearing 114, and head 120 are typically attached to the drive 100 as a subassembly component referred to as a head stack assembly ("HSA") 122.

Figure 2:
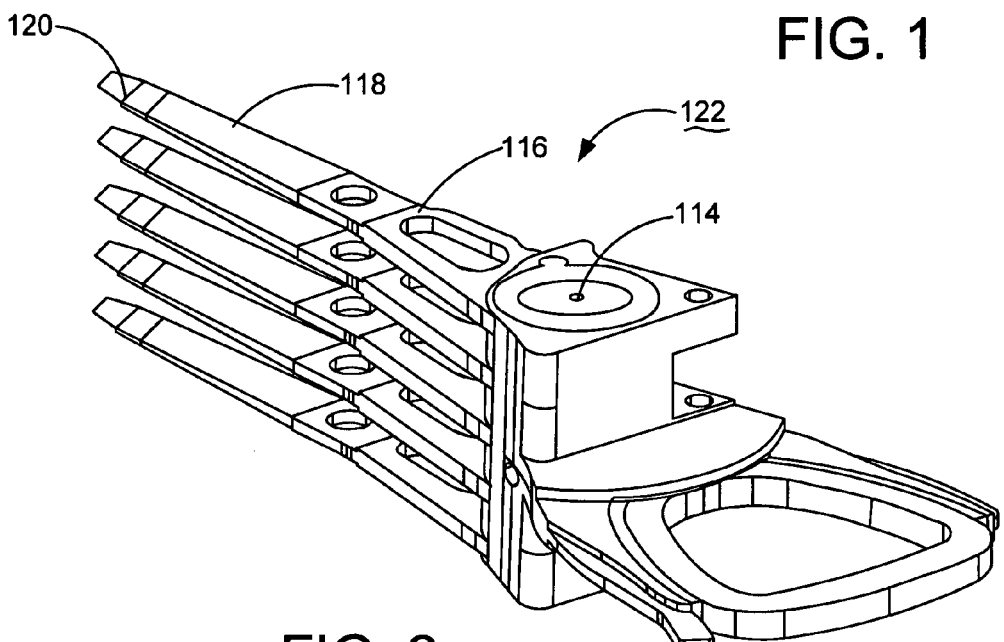
FIG. 2 is an isometric view of the head stack assembly in the device of FIG. 1.

FIG. 2 depicts an HSA 122 with multiple heads 120 used in a drive 100 having a stack of multiple discs 108, with one disc 108 operably disposed in each of the gaps between adjacent opposing heads 120 so that one head 120 is operably disposed adjacent each of the disc 108 surfaces.

Figure 3:
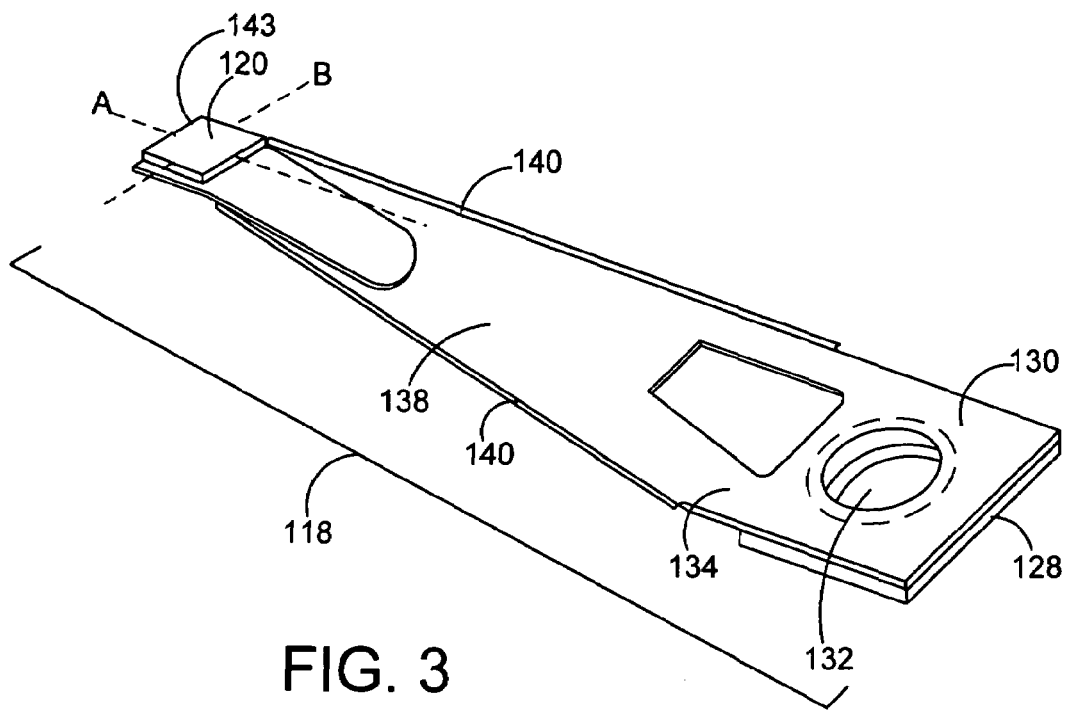
FIG. 3 is an isometric view of the suspension member of the head stack assembly of FIG. 2.

FIG. 3 is an isometric depiction of the suspension 118 that is attached at a proximal end 128 thereof to the arm 116. In these illustrated embodiments the suspension 118 has a mounting portion 130 defining an opening 132 that is sized to align with a mating feature on the arm 116 for fixing the two together, such as by swaging. In alternative equivalent embodiments other mounting features can be provided such as for adhering or welding the suspension 118 to the arm 116, and the like.

The suspension 118 has a spring section 134 that permits a predetermined flexure of the head 120 relative to the mounting section 130. The spring section 134 provides a preload bias of the head 120 toward the disc 108 when the disc 108 is not spinning, or in other words when the head 120 is in an unloaded state. The preload bias is countered by airflow pressure against the head 120 from the spinning disc 108 in the loaded state of the head 120. Balancing the preload bias and the airflow pressure results in a desired fly height of the head 120 adjacent the disc 108 in the loaded state. In the illustrated embodiments the spring section 134 defines an aperture 136 that reduces the cross sectional strength, and hence the rigidity, of the suspension 118 in the spring section 134.

A load beam 138 extends from the spring section 134. The load beam 138 has stiffening features, such as the formed rails 140, to ensure that all flexing occurs in the spring section 134.

A gimbal 142 is depicted as being attached to the load beam 138 at a distal end of the suspension 118. In alternative equivalent embodiments the gimbal 142 can be formed as a portion of the load beam 138, such as by etching it. A slider 143 is attached to the gimbal 142 and in turn supports the head 120.

In order to provide the desired fly height characteristics, the slider 143 is statically offset in relation to the mounting portion 130 within predetermined manufacturing tolerances. The unloaded position of the slider 143 is measured in terms of the pitch static attitude and roll static attitude. The pitch static attitude, or pitch aspect, is a measurement of the planar disposition of the slider 143 in relation to rotation around axis B. The roll static attitude, or roll aspect, is a measurement of the planar disposition of the slider 143 in relation to rotation around axis A.

It is imperative that the static offset of the slider 143 as well as the slider 143 pitch and roll static attitude, be verified during manufacturing. The present embodiments contemplate performing this verification after all the suspensions 118 have been longitudinally aligned and assembled into the HSA 122 level subassembly component of FIG. 2. Measuring these spatial characteristics in this manner yields comparatively more valuable information than measuring individual suspensions 118 as the exist in FIG. 3. This is due in part to the measurements being taken as the components will exist in the finally assembled drive 100. If these measurements are verified at the suspension 118 component level, then tolerance stacks and downstream operations can adversely affect the spatial characteristics, and yet go unchecked. Besides handling damage, for example, a shipping comb (not shown) is typically inserted between adjacent heads 120 to support them during transit, and to elastically separate adjacent heads 120 to form clearance gaps for merging the HSA 122 with the disc 108 stack. It is possible for the shipping comb insertion process to go awry so as to make the head 120 offset or pitch and roll static attitude out of tolerance.

Figure 4:
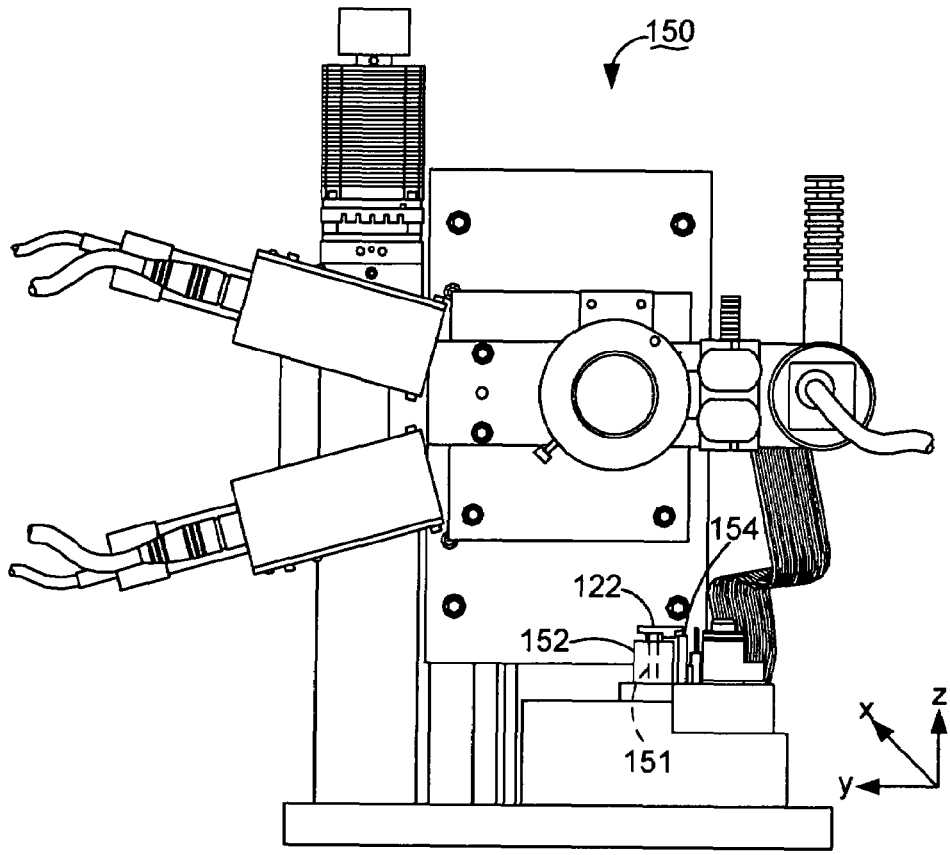
FIG. 4 is an elevational view of instrumentation constructed in accordance with embodiments of the present invention.

FIG. 4 is an elevational depiction of a measurement apparatus 150 that is constructed in accordance with embodiments of the present invention. Generally, the apparatus 150 is configured for measuring spatial characteristics of a complex test object such as the HSA 122. The apparatus 150 has a locating fixture 152 for securely positioning the HSA 122 during testing. In the embodiments of FIG. 4 the locating fixture 152 grippingly engages the rotatable spindle of the bearing 114 so that the HSA 122 is freely rotatable in the x-y plane.

Figure 5:
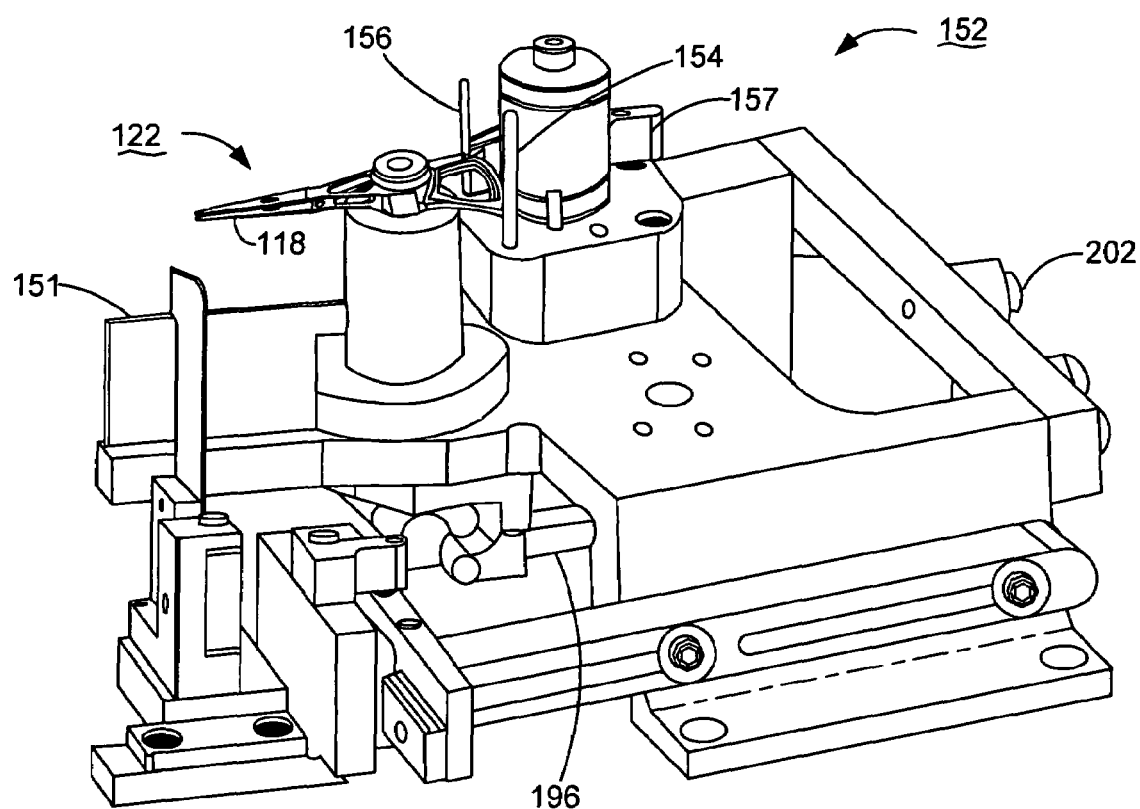
FIG. 5 is an isometric view of the fixture assembly of the instrumentation of FIG. 4.

FIG. 5 is an isometric view depicting the HSA 122 fixtured on the locating fixture 152. A clocking pin 154 is provided to abuttingly engage the HSA 122 where the suspensions 118 are longitudinally aligned with a reference object 151. A clocking member 156 is provided with a thumb lever 157 for the operator (or automated process) to press against in a counterclockwise direction, thereby pressingly locating the HSA 122 against the clocking pin 154 in rotation about the x-y plane.

Figure 6:
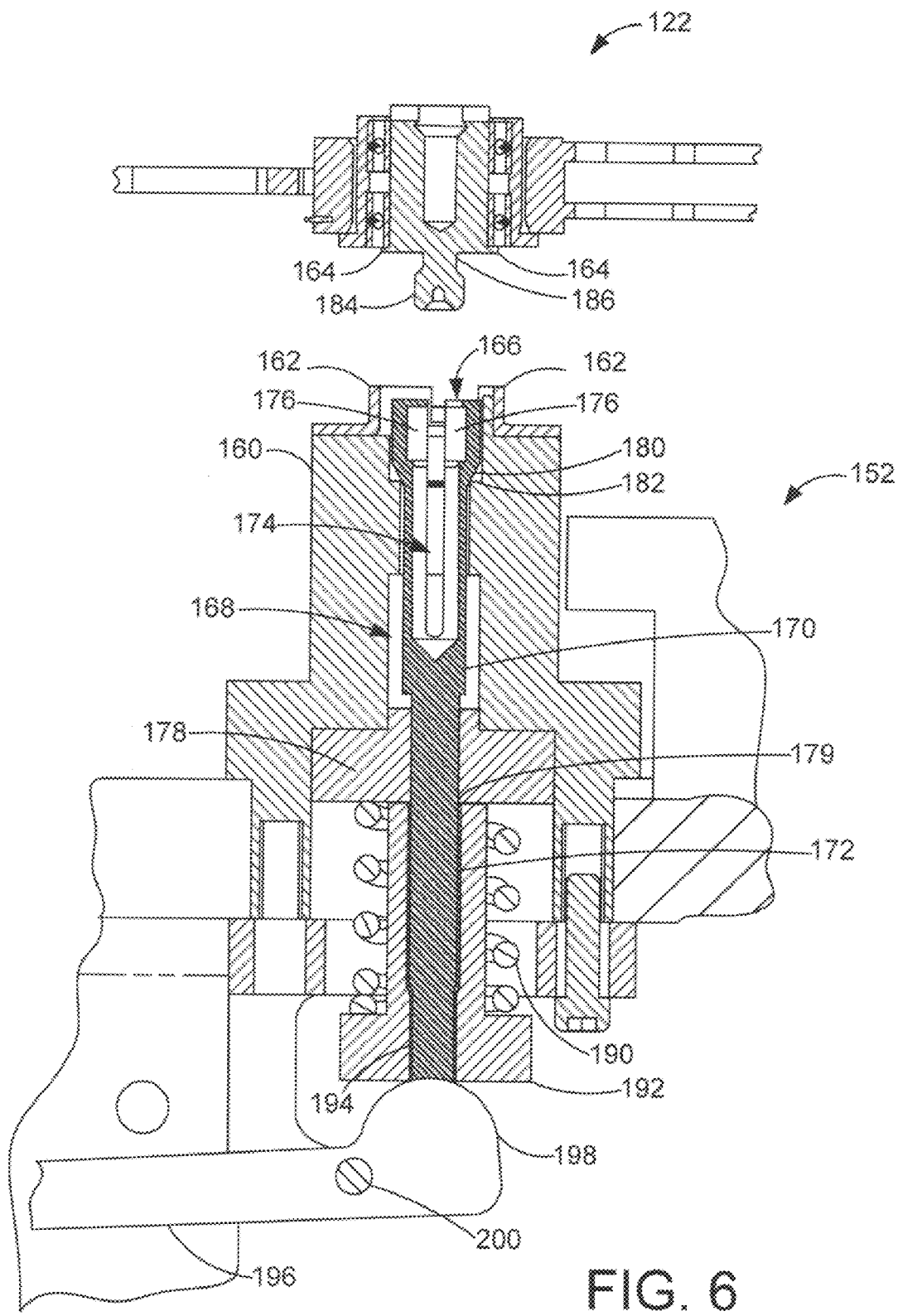
FIGS. 6 and 7 are cross section views of a portion of the fixture assembly of FIG. 5 in the expanded and retracted modes, respectively.
Figure 7:
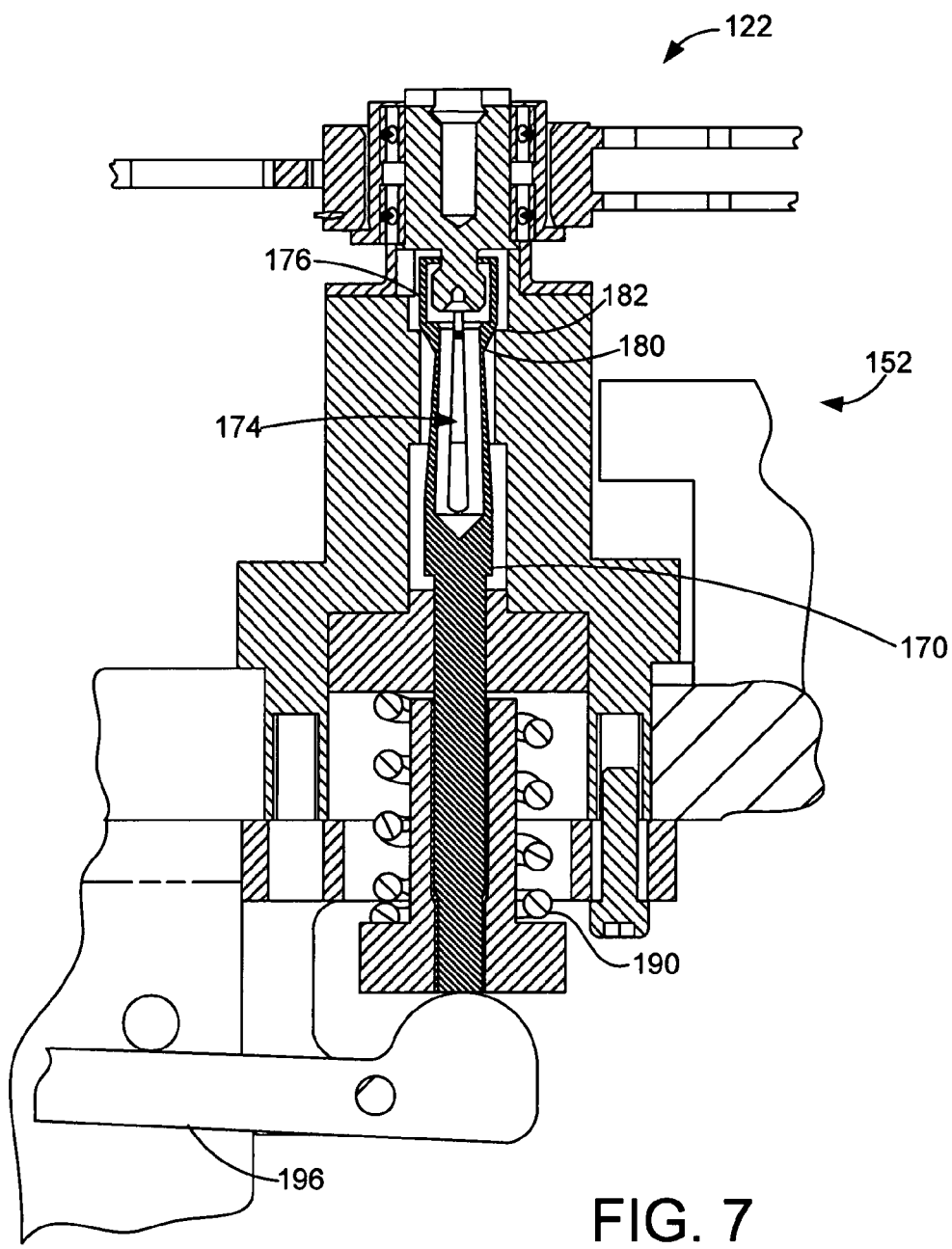

FIGS. 6 and 7 are similar cross sectional views of the locating fixture 152 but depicting the HSA 122 in unfixtured and fixtured conditions, respectively. The fixture 152 has a housing 160 defining a tooling datum surface 162. Preferably, the tooling datum surface 162 is annularly shaped and sized to matingly engage a datum surface 164 of the cartridge bearing portion of the HSA 122. The tooling datum surface 162 does not have to be continuous, and in fact preferably it is segmented by voids 166 so that the tooling datum surface 162 makes multi-point contact rather than a continuous contact with the HSA 122. Preferably, the tooling datum surface 162 makes a three-point contacting engagement with the component datum surface 164.

The housing defines a passage 168 within which a collet 170 is longitudinally slidable. Preferably, the collet 170 is substantially cylindrically shaped, with a substantially solid shaft 172 at a proximal end and a hollow portion extending therefrom. At a distal end a number of longitudinal voids 174 define a plurality of segmented gripping members 176.

Figure 8:
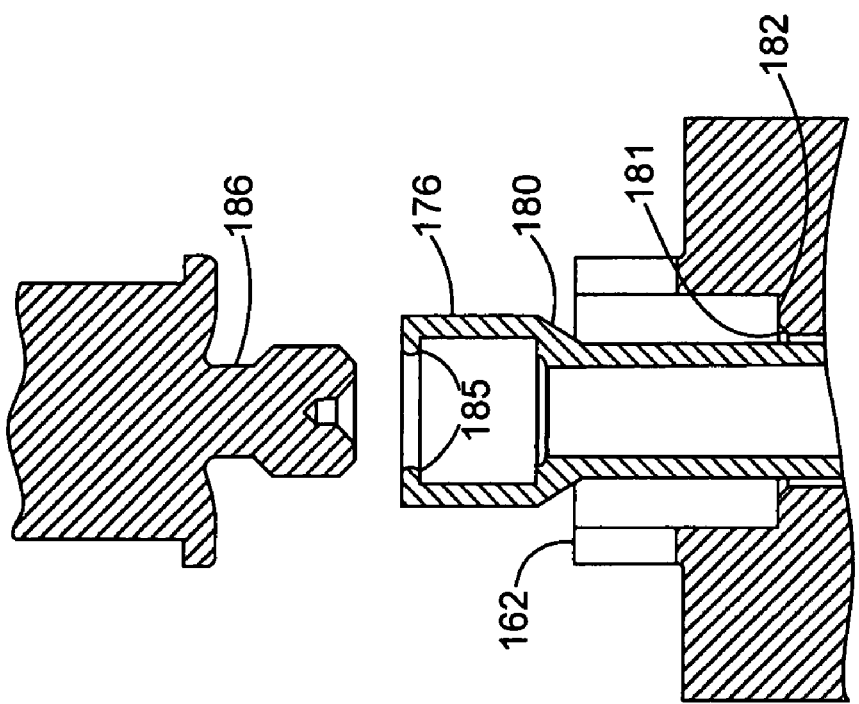

A bushing 178 is disposed within the passage 168 and provides a bore 179 sized for a close mating engagement with the shaft 172, thereby supporting the collet 170 in precise longitudinal movement within the passage 168. As the collet 170 moves downward from the position of FIG. 6 to that of FIG. 7, a tapered surface 180 contactingly engages a reduced-diameter bore feature, in this case a counterbore 182. FIG. 8 shows that the counterbore 182 preferably defines a chamfer 181 that matches the tapered surface 180. This contacting engagement deflects the gripping members 176 toward each other, as can be seen by the reduced size of the voids 174 in FIG. 7 as compared to FIG. 6.

Figure 9:
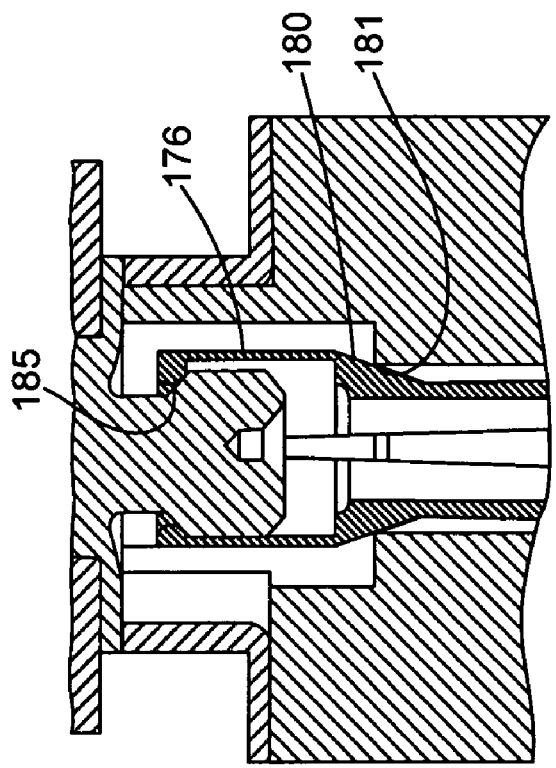
FIGS. 8 and 9 are enlarged detail views of the fixture assembly in the expanded and retracted modes, respectively.

In the embodiments of FIGS. 6 and 7 the collet 170 grippingly engages a threaded protuberant portion 184 that is otherwise used to attach the HSA 122 in the data storage device 100. As best shown in FIGS. 8 and 9, preferably the collet 170 defines a distal flange 185 that grippingly engages an undercut feature 186 at the base of the protuberant portion 184. It will be noted that a clearance is maintained between the gripping members 176 and the external thread so as to not damage the thread.

These embodiments are merely illustrative and not limiting of the embodiments contemplated by the present invention as recited by the language of the appended claims. For example, without limitation, the gripping members 176 in alternative equivalent embodiments might have mating surfaces or compressible materials that could be frictionally engageable with the thread on the protuberant feature 184.

Accordingly, the present embodiments generally contemplate the collet 170 being slidably supported by the housing 160 and thereby being selectively operable between an expanded mode, shown in FIG. 6, and a retracted mode, shown in FIG. 7. Particularly, the expanded mode defines a clearing disengagement of the distal end of the collet 170 with the protuberant feature 184 of the HSA 122. Conversely, the retracted mode defines a compressive contacting engagement of the distal end of the collet 170 with the protuberant feature 184 resulting from initial longitudinal displacement of the collet 170. Further longitudinal movement of the collet 170 transfers a longitudinal force through the contacting engagement to the protuberant feature 184. The compressing engagement of the collet 170 against the protuberant feature 184 imparts lateral forces fixing the HSA 122 in place. The longitudinal force pressingly engages the datum surfaces 162, 164 together to precisely and positively locate the HSA 122. This precise and positive fixturing of the HSA 122 enables manufacturing procedures executed on the HSA 122 to reference positional attributes in relation to the datum surfaces 162, 164.

Staying with FIGS. 6 and 7, a coil spring 190 is trained around the shaft 172 and compressingly disposed between the bushing 178 and a sleeve 192 attached to the shaft 172. The spring 190 exerts opposing tensile forces against the housing 160 and the collet 170 to urge the collet 170 to the retracted mode of FIG. 7. Preferably, the sleeve 192 is longitudinally positionable on the shaft 172 in order to selectively vary the longitudinal span encompassing the spring 190, thus adjusting the spring tension acting to retract the collet 170. This permits using the same spring for differently configured parts, or adjusting the collet stroke when necessary due to part-to-part variation. In the illustrative embodiments of FIGS. 6 and 7 the sleeve 192 and shaft are threadingly engaged in a region denoted by 194 for this purpose.

A lever 196 having a cam surface 198 is articulated around a pivot 200 to impart a force to the shaft 172 in opposition to the spring 190 force, thereby placing the collet 170 in the expanded mode of FIG. 6. Preferably, the fixture 152 has a latching member 202 (FIG. 5) for locking the lever 196 in the position associated with the expanded mode of the collet 170 (FIG. 6). This locked position of the collet 170 permits loading the HSA 122 to the fixture 152 while still being unencumbered by the contacting engagement with the fixture 152.

The structure described thus enables a method for precisely fixturing an HSA 122 in accordance with embodiments of the present invention. First, the spring-loaded collet 170 is locked in the extended position by latching the lever 196. The protuberant feature 184 can then be receivingly engaged within the segmented gripping members 176 at the distal end of the collet 170. The lever 196 is then unlatched, permitting the collet 170 to longitudinally displace and simultaneously contactingly engage the collet flanges 185 against the undercut feature 186 to laterally and longitudinally fix the HSA 122.

As described, preferably the collet flanges 185 contactingly engage the undercut portion 186 of the protuberant feature 184. This permits using a relatively lower compressing engagement force than is otherwise necessary where the gripping members 176 only frictionally engage the HSA 122. It will also be noted that by locking the collet 170 in the extended position, the step of inserting the protuberant feature 184 into the gripping members 176 can be more readily observed when the datum surfaces 162, 164 are in contacting engagement with each other.

Some embodiments of the present invention contemplate instrumentation for precisely fixturing a head stack assembly having a housing defining a surface sized to provide unencumbered support to the head stack assembly, and means for cantilevering the head stack assembly against the housing with longitudinal and lateral fixturing forces. For purposes of this description and meaning of the appended claims, "means for cantilevering" expressly contemplates the described structure and equivalents thereof that permit attaching only one side of the head stack assembly to the housing for positive positioning purposes, such as for measurement or testing procedures performed on the head stack assembly. The term "means for cantilevering" expressly does not contemplate other attempted solutions that do not cantilever the head stack assembly from the housing datum surface, such as but not limited to previous attempted solutions that provide a top clamp that compressingly engages against the top side of the head stack assembly.

The skilled artisan will readily recognize the distinguishing advantages of the contemplated embodiments that provide complete unrestricted access to the cantilevered test object for processing purposes. The cantilevered attachment action furthermore provides not only an effective means for fixing the test component, but also a solution that is optimally efficient for maximum throughput velocity. Furthermore, optimal process results are obtained by fixturing the test component in a manner that is similar to how the component is ultimately attached in the final assembly.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a moving media data storage device, it will be appreciated by those skilled in the art that the claimed subject matter is not so limited and various other systems can utilize the present embodiments without departing from the spirit and scope of the claimed invention.

What is claimed is:

1. A method for precisely fixturing a head stack assembly comprising:
   supporting a spring loaded collet in a housing, the collet having longitudinally segmented gripping members that are selectively moveable relative to the housing to different longitudinal positions differentiating a first mode, where the gripping members are radially expanded establishing a clearing disengagement from the head stack assembly, and a second mode, where the gripping members are radially retracted establishing a contacting engagement against the head stack assembly;
   latching the collet to retain the gripping members in the first mode;
   inserting a protuberant feature of the head stack assembly into the gripping members during the latching step;
   unlatching the collet to permit the spring to impart a longitudinal force to displace the gripping members to the second mode and to maintain the longitudinal force in the second mode so the longitudinal force transfers to the head stack assembly via the contacting engagement of the gripping members against the head stack assembly in the second mode of the gripping members.

2. The method of claim 1 wherein the protuberant feature is substantially cylindrical and the unlatching step is characterized by the gripping members contactingly engaging against an undercut portion of the protuberant feature.

3. The method of claim 1 wherein the inserting step is characterized as complete before a datum surface of the head stack assembly abuttingly engages a datum surface of the housing.

* * * * *